US010305669B2

(12) United States Patent
Nguyen et al.

(10) Patent No.: US 10,305,669 B2
(45) Date of Patent: May 28, 2019

(54) COHERENT LINK QUALITY ACROSS MULTIPLE MODULATIONS

(71) Applicant: Itron Global SARL, Liberty Lake, WA (US)

(72) Inventors: Viet-Hung Nguyen, Saint-Mande (FR); Yacine Khaled, Issy les Moulineaux (FR); Jerome Bartier, Edinburgh (GB)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 15/637,973

(22) Filed: Jun. 29, 2017

(65) Prior Publication Data

US 2019/0007186 A1    Jan. 3, 2019

(51) Int. Cl.
*H04L 1/00* (2006.01)
*H04L 5/14* (2006.01)
*H04L 27/00* (2006.01)

(52) U.S. Cl.
CPC .......... *H04L 5/1453* (2013.01); *H04L 1/0003* (2013.01); *H04L 27/0008* (2013.01); *H04B 2201/70703* (2013.01); *H04L 1/0001* (2013.01)

(58) Field of Classification Search
CPC ........................... H04L 5/1543; H04L 1/0003
See application file for complete search history.

(56) References Cited

U.S. PATENT DOCUMENTS

| | | | | |
|---|---|---|---|---|
| 8,902,799 | B2* | 12/2014 | Sutton | H04L 27/0012 370/311 |
| 2003/0135797 | A1* | 7/2003 | Choi | H03M 13/35 714/704 |
| 2005/0195732 | A1* | 9/2005 | Huh | H04L 1/1607 370/206 |
| 2010/0198304 | A1* | 8/2010 | Wang | A61N 1/3727 607/60 |
| 2010/0254479 | A1 | 10/2010 | Liao et al. | |
| 2011/0007790 | A1* | 1/2011 | Xu | H04L 1/0001 375/225 |
| 2013/0343255 | A1* | 12/2013 | Han | H04L 1/0009 370/312 |
| 2014/0328155 | A1* | 11/2014 | Dhanda | H04L 1/0003 370/215 |

(Continued)

OTHER PUBLICATIONS

The PCT Search Report and Written Opinion dated Oct. 2, 2018 for PCT Application No. PCT/US18/38610, 15 pages.

(Continued)

*Primary Examiner* — Jaison Joseph
(74) *Attorney, Agent, or Firm* — Lee & Hayes, P.C.

(57) ABSTRACT

Techniques directed to attributing information regarding communications with a modulation scheme to a different modulation scheme are described. In one example, a successful communication for a higher data rate modulation scheme may be attributed to a lower data rate modulation scheme. Such attribution may infer that the lower data rate modulation scheme would have also been successful if it had been used. In another example, an unsuccessful communication for a lower data rate modulation may be attributed to a higher data rate modulation scheme. Here, such attribution may infer that the higher data rate modulation scheme would have also been unsuccessful if it had been used.

20 Claims, 5 Drawing Sheets

(56) References Cited

U.S. PATENT DOCUMENTS

2015/0131512 A1* 5/2015 Lauer ................ H04L 5/1453
370/312
2016/0142177 A1* 5/2016 Chou ................ H04L 1/0005
370/329

OTHER PUBLICATIONS

Viswanathan, "Adaptive Coded Modulation Over Slow Frequency-Selective Fading Channels", Vehicular Technology Conference, IEEE, vol. 3, May 1999, pp. 2388-2392.

* cited by examiner

COHERENT LINK QUALITY ACROSS MULTIPLE MODULATIONS

BACKGROUND

Communication networks, such as wireless mesh networks, star networks, and so on, are used to connect a variety of different devices. These communication networks often contain devices having different characteristics and capabilities. As such, in many instances, the devices are able to communicate according to multiple modulation schemes. A device may select a modulation scheme for communication based on metrics associated with modulation schemes that are available. The metrics may indicate a success of previous communications for those modulation schemes. However, when relatively little information is available for a modulation scheme, that modulation scheme may not be evaluated correctly. For example, the same modulation scheme may be selected when it is associated with more metrics than another modulation scheme, even though the other modulation scheme may actually perform better.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

As discussed above, metrics about different modulation schemes may be evaluated to select an appropriate modulation scheme for a communication. However, in many instances relatively little information may be available about a modulation scheme, since the modulation scheme may not have been used frequently. This may lead to an incorrect evaluation of the modulation scheme.

This disclosure describes techniques directed to attributing information regarding communications with a modulation scheme to a different modulation scheme. In one example, a successful communication for a relatively high data rate modulation scheme may be attributed to a relatively low data rate modulation scheme. Such attribution may infer that the low data rate modulation scheme would have also been successful if it had been used instead of the high data rate modulation scheme. In another example, an unsuccessful communication for a relatively low data rate modulation may be attributed to a relatively high data rate modulation scheme. Here, such attribution may infer that the high data rate modulation scheme would have also been unsuccessful if it had been used instead of the low data rate modulation scheme. As such, the techniques may generate communication metric data for a modulation scheme that has not been used frequently or is otherwise associated with less communication metric data (e.g., less metrics) than another modulation scheme. This may ultimately harmonize communication metric data across multiple modulation schemes.

In one illustration, a device may communicate with another device according to a first modulation scheme that is associated with a relatively high data rate. The two devices may communicate over a link (e.g., a direct communication path between the devices). The device may store information regarding a number of transmission attempts to the other device, a number of transmissions acknowledged by the other device, and so on. Such information may generally represent communication metric data regarding successful and/or unsuccessful transmissions on the link between the two devices. The device may use the communication metric data for actual transmissions with the first modulation scheme to update communication metric data for a second modulation scheme, such as a modulation scheme that has not been used as much as the first modulation scheme. The second modulation scheme may be associated with a lower data rate. In particular, the device may attribute a successful transmission with the first modulation scheme (e.g., a transmission that was acknowledged by the other device) to communication metric data associated with the second modulation scheme. For example, the device may update a number of transmission attempts for the second modulation scheme to include an additional attempt and update a number of transmissions acknowledged for the second modulation scheme to include an additional transmission acknowledged. Thus, a successful transmission may be applied to the second modulation scheme based on an actual successful transmission with the first modulation scheme.

In another illustration, a device may communicate with another device according to a first modulation scheme that is associated with a relatively low data rate. In a similar manner as that mentioned above, the device may store information regarding a number of transmission attempts to the other device, a number of transmissions acknowledged by the other device, and so on. Such information may generally represent communication metric data for the first modulation scheme. The device may use the communication metric data for actual transmissions with the first modulation scheme to update communication metric data for a second modulation scheme that is associated with a higher data rate. In particular, the device may attribute an unsuccessful transmission with the first modulation scheme (e.g., a transmission that was not acknowledged by the other device) to communication metric data associated with the second modulation scheme. For example, the device may update a number of transmission attempts for the second modulation scheme to include an additional attempt. Thus, an unsuccessful transmission may be applied to the second modulation scheme based on an actual unsuccessful transmission with the first modulation scheme.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein applicable to any communications network, control network, and/or another type of network or system.

In one example, the techniques may be implemented in the context of the Internet of Things (IoT).

Example Environment

Figure 1:
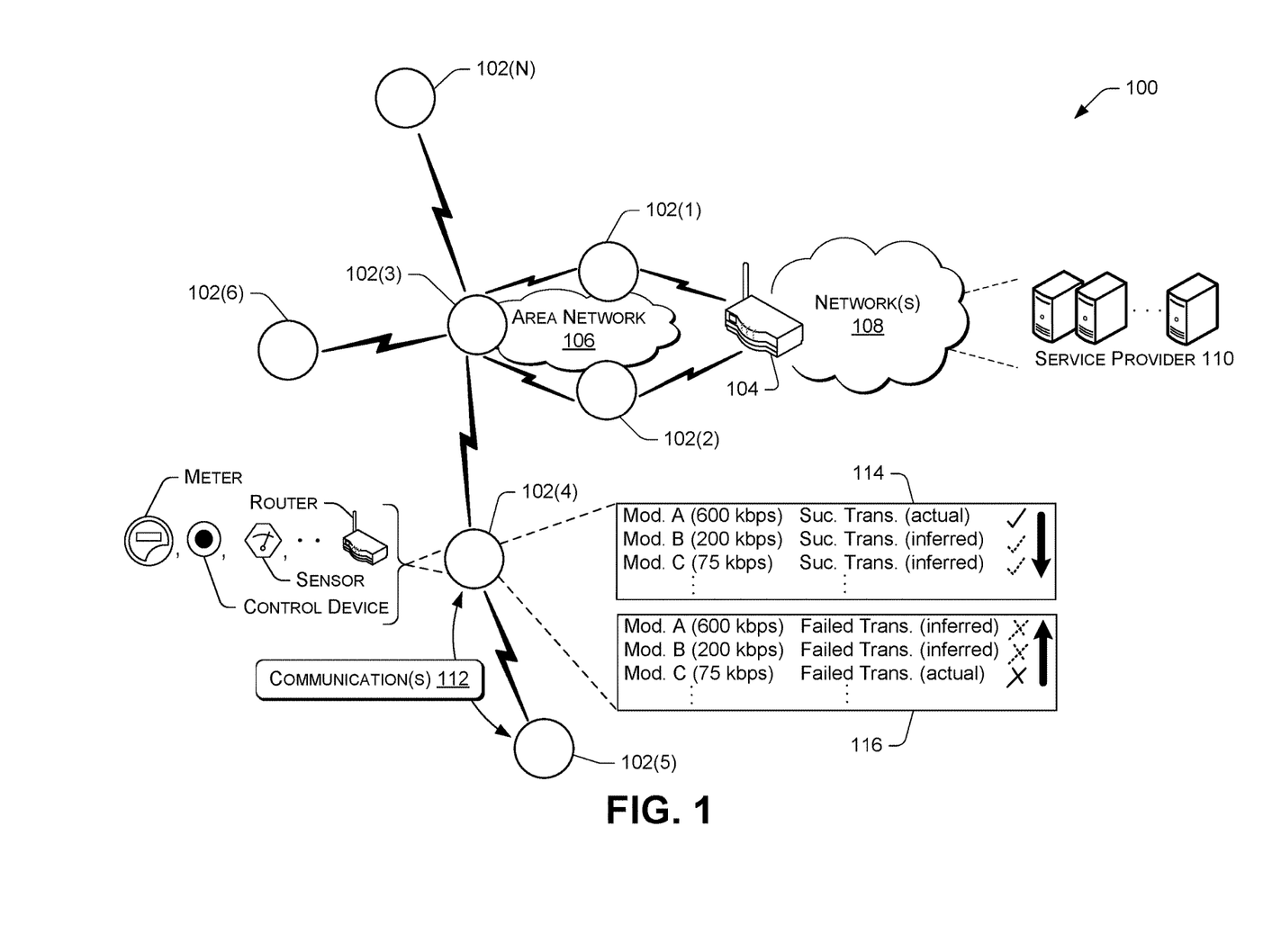
FIG. 1 is a schematic diagram of an example network architecture.

FIG. 1 is a diagram illustrating an example networked environment or architecture 100. The architecture 100 includes multiple network communication devices 102(1)-102(N) (collectively referred to as "network communication devices 102") and a network communication device 104, where N is any integer greater than or equal to 1. The network communication devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108. Any of the network communication devices 102, the network communication device 104, and/or the service provider 110 may perform processing to attribute information regarding communications with a first modulation scheme to a second modulation scheme.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the AN 106 may comprise a star network, in which a central device acts a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data.

The service provider 110 may be physically located in a single central location, or may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the network communication devices 102, the network communication device 104, and/or the service provider 110 may perform processing to attribute information regarding communications with a first modulation scheme to a second modulation scheme. In the example of FIG. 1, the network communication device 102(4) attributes communication metric data for a first modulation scheme to a second modulation scheme. For instance, the network communication device 102(4) may transmit and/or receive one or more communications/transmissions (e.g., Protocol Data Units (PDUs), such as bits, frames, packets, segments, etc.) with the network communication device 102(5) with a relatively high data rate modulation scheme ("Mod. A"). If a transmission is successful (e.g., it is acknowledged by the network communication device 102 (5)), the network communication device 102(4) may update, at 114, communication metric data for other modulation schemes to indicate a successful transmission, even though the other modulation schemes were not used. Here, all other modulations schemes that are associated with lower data rates than "Mod. A" may be updated. Although any number of modulation schemes may be updated.

Further, the network communication device 102(4) may transmit one or more communications to the network communication device 102(5) with a relatively low data rate modulation scheme ("Mod. C"). If a transmission is unsuccessful (e.g., it is not acknowledged by the network communication device 102(5)), the network communication device 102(4) may update, at 116, communication metric data for other modulation schemes to indicate an unsuccessful transmission, even though the other modulation schemes were not used. Here, all other modulations schemes that are associated with higher data rates than "Mod. C" may be updated. Although any number of modulation schemes may be updated.

Communication metric data may include a detected/measured value, a computed value, or any other statistic, metric, or value related to communication. For example, communication metric data may indicate a number of transmission attempts (e.g., a number of transmissions sent), a number of successful transmissions (e.g., a number of transmissions that are acknowledged by a receiving node), a number of unsuccessful transmissions (e.g., calculated by subtracting a number of transmission attempts by a number of acknowledgements), and so on. Further, in some examples communication metric data includes an Expected Transmission (ETX) metric and/or an Expected Transmission Time (ETT) metric, as discussed in further detail below.

In many instances, communication metric data may include data that is specific to a particular modulation scheme and/or a particular link (e.g., direct communication path between devices). To illustrate, communication metric data may indicate a number of successful transmissions and a number of transmission attempts via a particular link (between a first node and a second node) with a particular modulation scheme.

An ETX metric may generally indicate an expected number of transmissions required to successfully send a transmission to a device. The ETX metric may be computed in a variety of manners. In one example, an ETX metric equals a total number of transmissions sent (e.g., transmission attempts) over a number of successful transmissions (e.g., transmissions acknowledged). In another example, an ETX metric equals 1/P, where P=Pf×Pr. Here, Pf corresponds to a probably that a transmission successfully arrives at a recipient, and Pr corresponds to a probability that an acknowledgment transmission is successfully received by a sender. Pf and Pr may be calculated according to the following formulas:

$$Pf = \frac{\text{Number of transmissions (e.g., probes)}}{\text{Number of transmissions (e.g., probes) sent by a sender}}$$

$$Pr = \frac{\text{Number of transmissions (e.g., probes) received by a sender}}{\text{Number of transmissions (e.g., probes) sent by a neighbor (e.g., recipient)}}$$

In some instances, such as where Pf and Pr cannot be computed separately (e.g., when the sender does not know the number of transmissions that a receiver sent to it), then the ETX metric may be estimated as in the first example above. That is, if Pf and Pr cannot be computing separately due to a lack of information, the ETX metric may correspond to a total number of transmissions sent over a number of successful transmissions.

An ETT metric may generally indicate an expected time required to successfully send a transmission to a device. In one example, the ETT metric equals a time to transmit a transmission of a given size multiplied to the ETX metric.

Communication metric data may be used in a variety of manners. In some instances, communication metric data is used to select a modulation scheme for communicating. For example, a network communication device may select a modulation scheme to use for communicating on a particular link based on ETX metrics for multiple modulation schemes that are available for the link. In particular, if a first modulation scheme that is supported by two network communication devices is associated with a lower ETX metric than a second modulation scheme that is also supported by the two network communication devices, the first modulation scheme may be selected.

Example Network Communication Device

Figure 2:
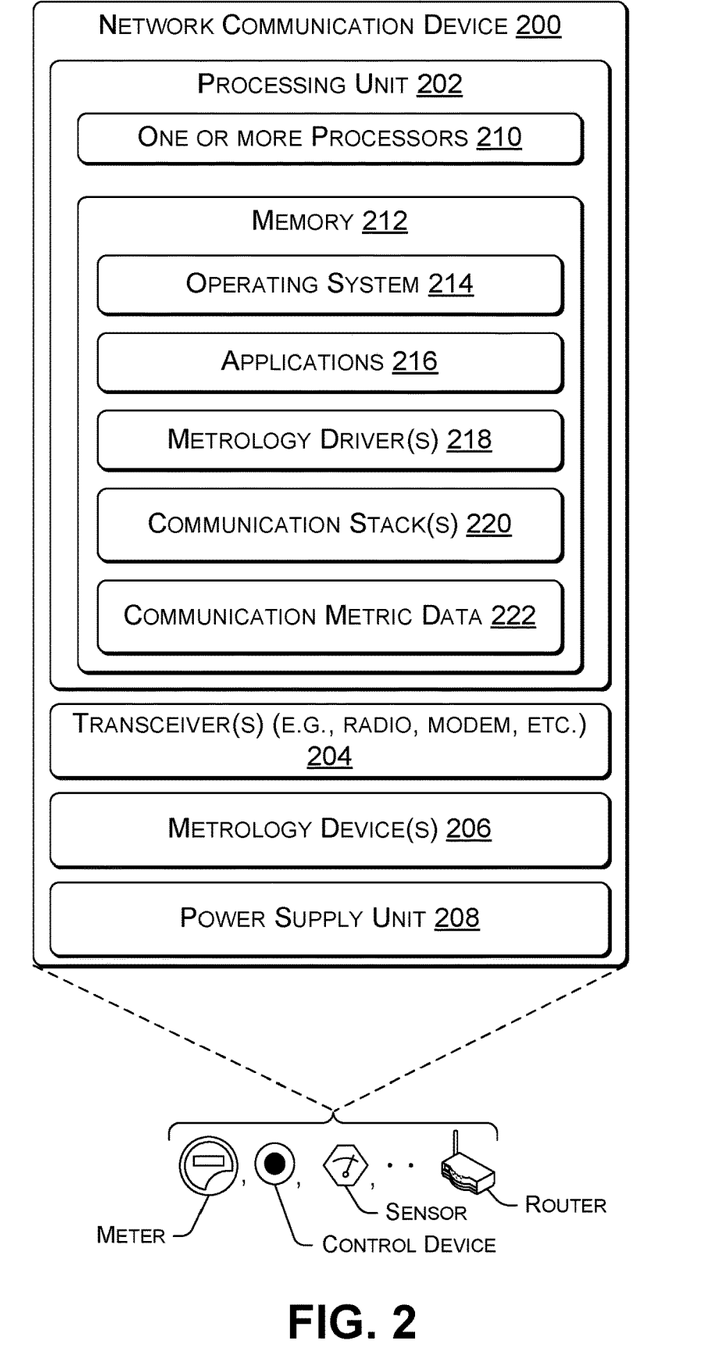
FIG. 2 is a diagram showing details of an example network communication device.

FIG. 2 is a diagram showing details of an example network communication device 200, such as any of the network communication devices 102 or the network communication device 104. The network communication device 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 comprises a Full Function Device (FFD), while in other instances the network communication device 200 comprises a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 comprises physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as a FFD, the power supply unit 208 comprises a mains power connector that couples to an Alternating Current (AC) or Direct Current (DC) mains power line where the network communication device 200 is installed. In other instances, such as when the network communication device 200 is implemented as a LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 includes an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also store communication metric data 222. Communication metric data 222 may be updated from time to time to maintain data for multiple modulation schemes and/or multiple communication links.

In some instances, the network communication device 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The network communication device 200 may be configured to implement a variety of modulation schemes. A modulation scheme may be associated with a modulation type, a data rate, and/or other parameters. In some instances, a same modulation type is used for different modulations schemes to produce different data rates.

Example modulation schemes include: Direct-Sequence Spread Spectrum (DSSS), Quadrature Phase-Shift Keying (QPSK) (e.g., "$LONG_{13}$ RANGE" scheme) associated with a data rate of 12.5 kbps; Frequency Shift Keying (FSK) (e.g., "4G_FSK_150" scheme) associated with a data rate of 75 kbps; Orthogonal Frequency-Division Multiplexing (OFDM) (e.g., "4G_OFDM_200" scheme) associated with a data rate of 200 kbps; OFDM (e.g., "4G_OFDM_600" scheme) associated with a data rate of 600 kbps; Differential 8 PSK (D8PSK) associated with a data rate of around 200 kbps; Differential Quadrature PSK (DQPSK) associated with a data rate of around 165 kbps; Differential Binary PSK (DBPSK) associated with a data rate of around 105 kbps; Robust OFDM (ROBO); or any other modulation scheme. DSSS QPSK (e.g., "$LONG_{13}$ RANGE" scheme), FSK (e.g., "4G_FSK_150" scheme), OFDM (e.g., "4G_OFDM_200" scheme), and OFDM (e.g., "4G_OFDM_600" scheme) may correspond to RF modulation schemes. Meanwhile, D8PSK, DQPSK, DBPSK, and ROBO may correspond to PLC modulation schemes. Although any other modulation schemes may be used.

In many instances, the above noted modulation schemes may be ordered according to data rates as follows:

(i) For RF: 4G_OFDM_600>4G_OFDM_200>4G_FSK_150> LONG RANGE;

(ii) For PLC: D8PSK>DQPSK>DBPSK>ROBO

The memory 212 of the network communication device 200 may include software functionality configured as one or more "modules." The modules are intended to represent example divisions of software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Example Processes

Figure 3:
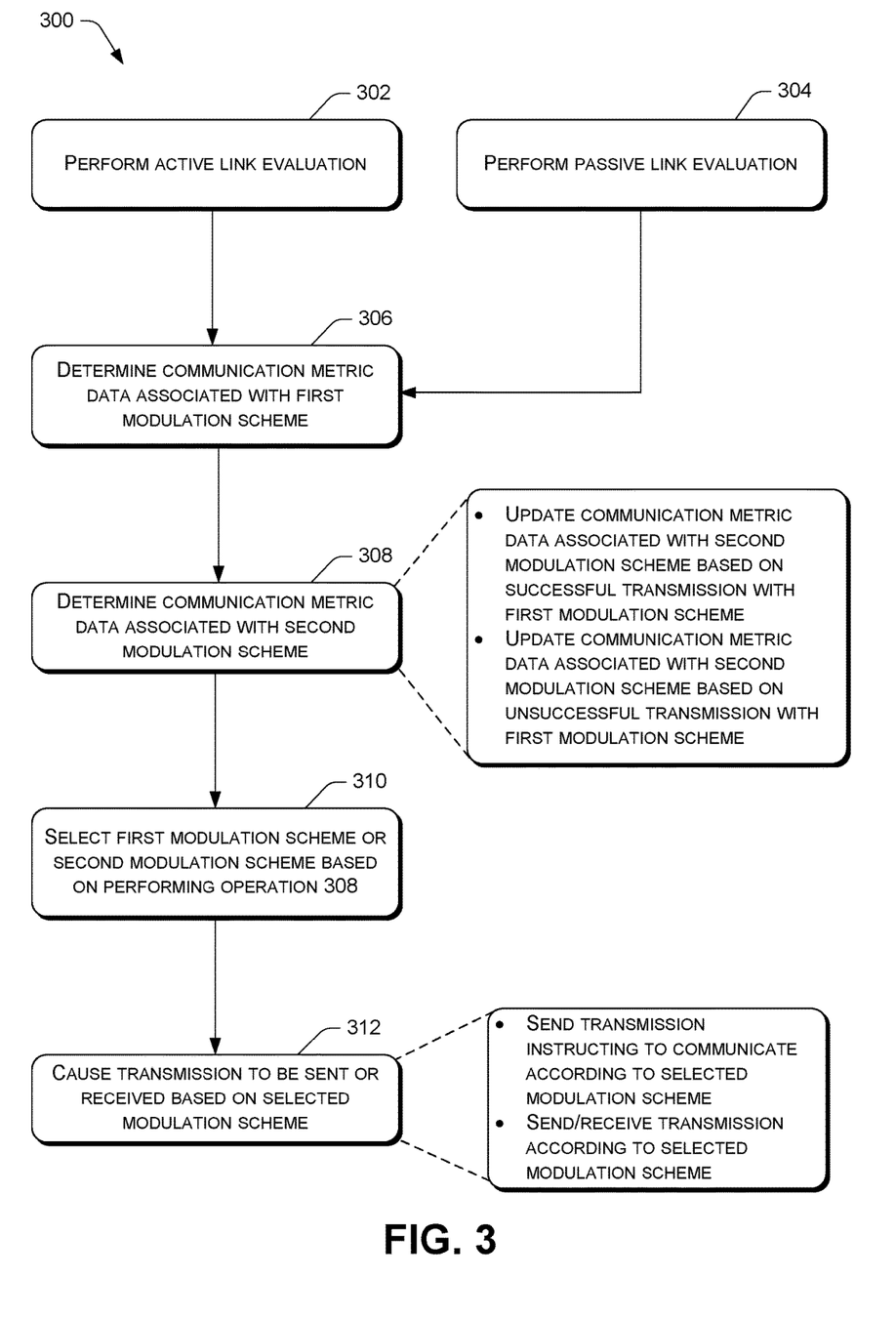
FIG. 3 illustrates an example process to attribute information regarding communications that have occurred with a modulation scheme to another modulation scheme.
Figure 4:
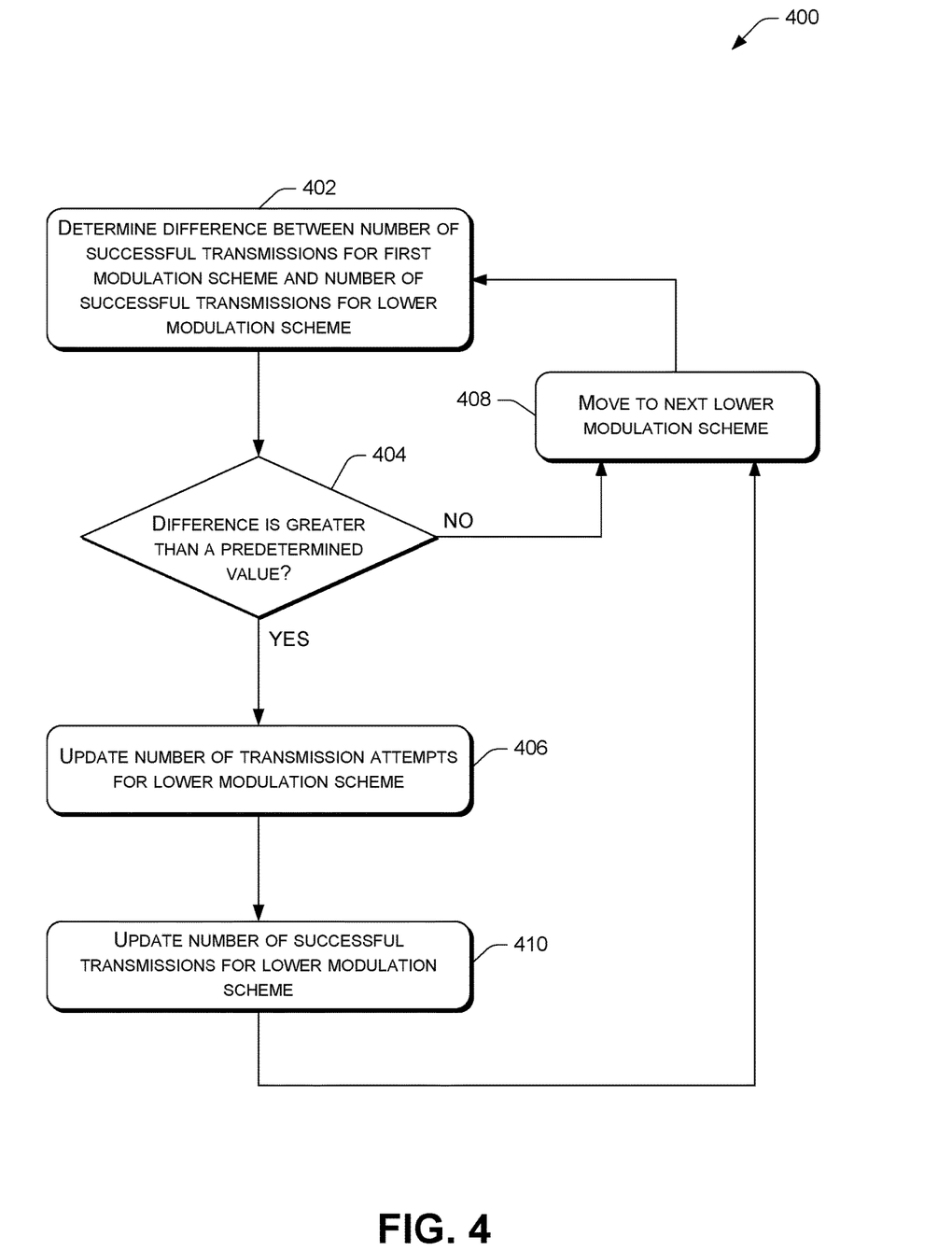
FIG. 4 illustrates an example process to update communication metric data for a modulation scheme based on a successful transmission for another modulation scheme.
Figure 5:
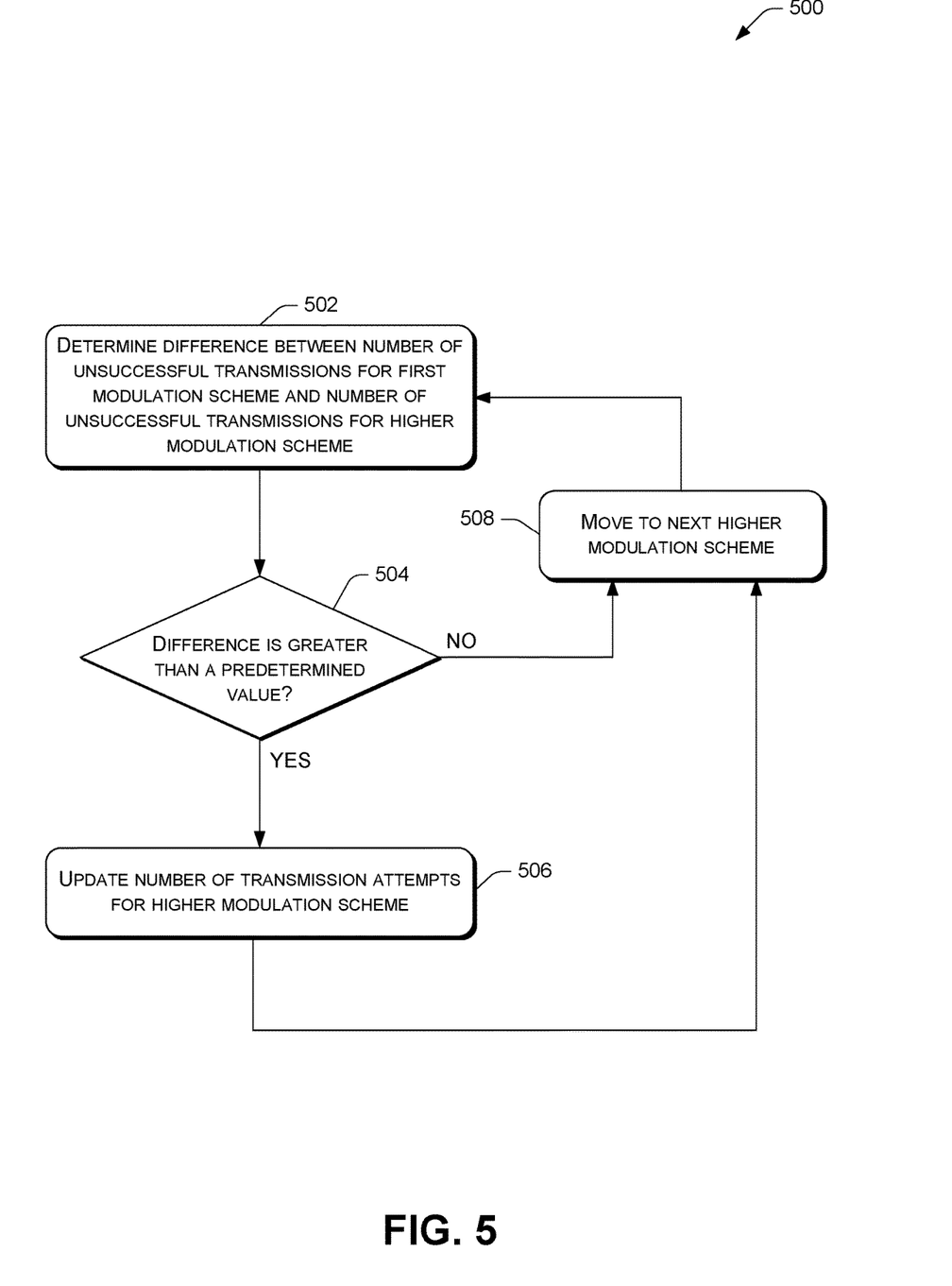
FIG. 5 illustrates an example process to update communication metric data for a modulation scheme based on an unsuccessful transmission for another modulation scheme.

FIGS. 3, 4, and 5 illustrate example processes 300, 400, and 500 for employing the techniques discussed herein. For ease of illustration the processes 300, 400, and 500 may be described as being performed by a device described herein, such as the network communication device 200 and/or the service provider 110. However, the processes 300, 400, and 500 may be performed by other devices. Moreover, the devices may be used to perform other processes.

The processes 300, 400, and 500 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 3 illustrates the example process 300 to attribute information regarding communications that have occurred with a modulation scheme to another modulation scheme.

The network communication device 200 may initiate a link evaluation in a variety of manners (e.g., through 302, 304, or another operation). In one example, at 302, the network communication device 200 performs an "Active Link Evaluation." Here, the network communication device 200 determines that a predetermined period of time has passed since a previous update to communication metric data. This determination may trigger one or more transmissions to be sent by the network communication device 200 to another network communication device, such one or more probe transmissions. If successful, these transmissions are acknowledged by the other network communication device (e.g., the network communication device 200 receives an acknowledgement(s) of the transmissions from the other network communication device). After sending the one or more transmissions (and/or receiving acknowledgements), the process 300 may proceed to 306 to evaluate a link. As such, in the Active Link Evaluation, a link may be evaluated periodically based on actively sending transmissions.

In another example, at 304, the network communication device 200 performs a "Passive Link Evaluation." Here, the network communication device 200 maintains normal operations by sending transmissions as they normally occur according to a communication schedule. After determining that a period of time has passed, the network communication device 200 may determine if there have been a predetermined number of transmissions on a link to trigger an evaluation of the link. When the network communication device 200 determines that the predetermined number of transmissions have occurred, the network communication device 200 may proceed to operation 306 to evaluate a link.

In either example, the network communication device 200 may have communicated with another network communication device (e.g., node) one or more times to a first modulation scheme. The first modulation scheme may be associated with a first data rate (e.g., bit rate). The communicating may include sending and/or receiving transmissions with the other network communication device.

At 306, the network communication device 200 may determine (or generate) communication metric data associated with the first modulation scheme. The communication metric data associated with the first modulation scheme may indicate at least one of a number of successful transmissions with the other network communication device (e.g., a number of acknowledgements received from the other network communication device) and/or a number of unsuccessful transmissions with the second node (e.g., unsuccessful transmissions=number of transmissions sent−number of acknowledgments received). Additionally, or alternatively, the communication metric data may include an Expected Transmission (ETX) metric, an Expected Transmission Time (ETT) metric, and so on. Operation 306 may be based on transmissions that occurred through either an Active Link Evaluation (302) and/or a Passive Link Evaluation (304).

At 308, the network communication device 200 may determine communication metric data associated with a second modulation scheme. In some instances, this includes updating existing communication metric data for the second modulation scheme, while in other instances this includes generating new communication metric data for the second modulation scheme. Operation 308 may also be based on transmissions that occurred through either an Active Link Evaluation (302) and/or a Passive Link Evaluation (304).

In one example, if the first modulation scheme is associated with a lower data rate than the second modulation scheme, then the communication metric data associated with the second modulation scheme (for the link between the network communication device 200 and the other network communication device) may be updated to account for at least one unsuccessful transmission via the link for the first modulation scheme. As such, in some instances, operation 308 may attribute at least one unsuccessful transmission for the first modulation scheme to the second modulation scheme.

In another example, if the first modulation scheme is associated with a higher data rate than the second modulation scheme, then the communication metric data associated with the second modulation scheme (for the link between the network communication device 200 and the other network communication device) may be updated to account for at least one successful transmission via the link for the first modulation scheme. As such, in some instances, operation 308 may attribute at least one successful transmission for the first modulation scheme to the second modulation scheme.

In many instances, operation 308 may include performing the example process 400 of FIG. 4 and/or the example process 500 of FIG. 5 to update communication metric data for multiple modulation schemes, as discussed in further detail below.

At 310, the network communication device 200 may select the first modulation scheme or the second modulation scheme based on updating communication metric data at operation 308. For example, the network communication device 200 may determine a modulation scheme that has a highest success rate, such as a modulation scheme that is associated with a best ETX metric (e.g., a lowest ETX metric). The ETX metric may be included in communication metric data and/or be computed from the communication metric data.

At 312, the network communication device 200 may cause a transmission to be sent or received based on the selected modulation scheme. In one example, such as when the network communication device 200 is controlling or instructing another device, or when operation 312 is performed by a service provider, operation 312 includes sending a transmission to the other device instructing the other device to send or receive a transmission according to the selected modulation scheme. In another example, the network communication device 200 sends or receives a transmission according to the selected modulation scheme. This may include configuring a radio of the network communication device 200 to operate according to the selected modulation scheme.

FIG. 4 illustrates the example process 400 to update communication metric data for a modulation scheme based on a successful transmission for another modulation scheme.

As noted above, the process 400 may be performed at operation 308 of FIG. 3. Although the process 400 may be performed in other contexts.

At 402, the network communication device 200 may determine a difference between a number of successful transmissions on a link for a first modulation scheme and a number of successful transmissions on the link for a second modulation scheme that is associated with a lower data rate. For ease of illustration, the second modulation scheme will be referred to as the lower modulation scheme.

At 404, the network communication device 200 may determine if the difference is greater than a predetermined value (e.g., zero). If the difference is greater than the predetermined value, the process 400 may proceed to operation 406 (e.g., the "YES" branch). Alternatively, if the difference is not greater than the predetermined value, the process 400 may proceed to 408 (e.g., the "NO" branch).

At 406, the network communication device 200 may update a number of transmission attempts (i.e., a number of transmissions sent) on the link for the lower modulation scheme to include the difference.

At 410, the network communication device 200 may update the number of successful transmissions on the link for the lower modulation scheme to include the difference.

At 408, the network communication device 200 may proceed to the next lower modulation scheme (e.g., the modulation scheme associated with the next lowest data rate). In other words, the lower modulation scheme mentioned in 402 would be the next lower modulation scheme. The process 400 may then perform operation 402 to determine a difference between the number of successful transmissions on the link for the first modulation scheme and a number of successful transmissions on the link for the next lower modulation scheme. The first modulation scheme would remain the same.

This may be repeated any number of times until all lower modulation schemes are updated (or a predetermined number).

In many instances, once the first modulation scheme has been compared to all lower modulation schemes (e.g., multiple loops have been performed), the process 400 may move to the next lower modulation scheme (e.g., the first modulation scheme is now the modulation scheme associated with the next lowest data rate) and perform multiple loops, if necessary, to compare the next lower modulation scheme to modulation schemes that are associated with lower data rates than the next lower modulation scheme. As such, there may be multiple loops within multiple loops.

To illustrate, assume that multiple transmissions occurred on a link over a period of time with multiple modulation schemes. At the time of evaluating the link, the following events had occurred, as illustrated in Table 1 below.

TABLE 1

| Mod. Scheme | Data Rate | Sent | Ack |
|---|---|---|---|
| OFDM | 200 kbps | 12 | 4 |
| FSK | 75 kbps | 9 | 2 |
| LONG RANGE | 12 kbps | 7 | 3 |
| ... | | | |

In this illustration, the process 400 would first start at the OFDM modulation scheme, since it is associated with the highest data rate. At 402, the difference between the number of successful transmissions for OFDM (4) and the number of successful transmissions for FSK (2) is determined. Here, the difference is 2 (i.e., 4−2). Since the difference is greater than the predetermined value, which is zero in this example, the process 400 proceeds to 406 and 410. At 406, the number of transmissions sent for FSK (9) is updated with the difference (2). This results in increasing the number of transmissions sent for FSK to 11. Further, at 410, the number of successful transmissions for FSK (2) is updated with the difference (2). This results in increasing the number of successful transmissions to 4. As such, the new ETX metric for FSK would be 11/4, instead of 9/2.

In this illustration, the process 400 then proceeds to the next lower modulation scheme LONG RANGE. Similar processing is performed to update LONG RANGE based on the number of successful transmissions for OFDM. For example, at 402, the difference between the number of successful transmissions for OFDM (4) and the number of successful transmissions for LONG RANGE (3) is determined. Here, the difference is 1, which results in the number of transmission attempts for LONG RANGE and the number of successful transmissions for LONG RANGE being increased by 1.

The process 400 is repeated any number of times with respect to OFDM (e.g., in order to compare OFDM to all lower modulation schemes). Then, the process 400 may move on to FSK.

FIG. 5 illustrates the example process 500 to update communication metric data for a modulation scheme based on an unsuccessful transmission for another modulation scheme. As noted above, the process 500 may be performed at operation 308 of FIG. 3. Although the process 500 may be performed in other contexts.

At 502, the network communication device 200 may determine a difference between a number of unsuccessful transmissions on a link for a first modulation scheme and a number of unsuccessful transmissions (e.g., failures) on the link for a second modulation scheme that is associated with a higher data rate. For ease of illustration, the second modulation scheme will be referred to as the higher modulation scheme.

At 504, the network communication device 200 may determine if the difference is greater than a predetermined value (e.g., zero). If the difference is greater than the predetermined value, the process 500 may proceed to operation 506 (e.g., the "YES" branch). Alternatively, if the difference is not greater than the predetermined value, the process 500 may proceed to 508 (e.g., the "NO" branch).

At 506, the network communication device 200 may update a number of transmission attempts (i.e., a number of transmissions sent) on the link for the higher modulation scheme to include the difference.

At 508, the network communication device 200 may proceed to the next higher modulation scheme (e.g., the modulation scheme associated with the next highest data rate). In other words, the higher modulation scheme identified in 502 would be the next lower modulation scheme.

The process 500 may then perform operation 502 to determine a difference between the number of unsuccessful transmissions on the link for the first modulation scheme and a number of unsuccessful transmissions on the link for the next higher modulation scheme. The first modulation scheme would remain the same.

This may be repeated any number of times until all higher modulation schemes are updated (or a predetermined number).

In many instances, once the first modulation scheme has been compared to all higher modulation schemes (e.g., multiple loops have been performed), the process 500 may move to the next higher modulation scheme (e.g., the first modulation scheme is now the modulation scheme associated with the next highest data rate) and perform multiple loops, if necessary, to compare the next higher modulation scheme to modulation schemes that are associated with higher data rates than the next higher modulation scheme. As such, there may be multiple loops within multiple loops.

To illustrate, assume that multiple transmissions occurred on a link over a period of time with multiple modulation schemes. At the time of evaluating the link, the following events had occurred, as illustrated in Table 2 below.

TABLE 2

| Mod. Scheme | Data Rate | Sent | Ack |
|---|---|---|---|
| OFDM | 200 kbps | 7 | 3 |
| FSK | 75 kbps | 21 | 6 |
| LONG RANGE | 12 kbps | 28 | 7 |

In this illustration, the process 500 would first start at the LONG RANGE modulation scheme, since it is associated with the lowest data rate. At 502, the difference between the number of unsuccessful transmissions for LONG RANGE (28−7=21) and the number of unsuccessful transmissions for FSK (21−6=15) is determined. Here, the difference is 6 (i.e., 21−15). Since the difference is greater than the predetermined value, which is zero in this example, the process 500 proceeds to 506. At 506, the number of transmissions sent for FSK is updated with the difference (6). This results in increasing the number of transmissions sent for FSK to 27. The acknowledgements stay the same. As such, the new ETX metric for FSK is 27/6.

In this illustration, the process 500 then proceeds to the next higher modulation scheme OFDM. Similar processing is performed to update OFDM based on the number of unsuccessful transmissions for LONG RANGE. For example, at 502, the difference between the number of unsuccessful transmissions for LONG RANGE (28−7=21) and the number of unsuccessful transmissions for OFDM (7−3=4) is determined. Here, the difference is 17, which results in the number of transmissions sent for OFDM being increased by 17.

After the process 500 is repeated any number of times with respect to LONG RANGE (e.g., in order to compare LONG RANGE to all higher modulation schemes), the process 500 may move on to FSK

What is claimed is:

1. A method comprising:
communicating, by a first node and via a communication link between the first node and a second node, with the second node according to a first modulation scheme, the first modulation scheme being associated with a first data rate;
determining, by the first node, first communication metric data associated with the first modulation scheme, the first communication metric data indicating at least one of a number of successful transmissions with the second node for the first modulation scheme or a number of unsuccessful transmissions with the second node for the first modulation scheme;
identifying, by the first node, second communication metric data associated with a second modulation scheme, the second communication metric data indicating at least one of a number of successful transmissions with the second node for the second modulation scheme or a number of unsuccessful transmissions with the second node for the second modulation scheme, the second communication metric data being associated with a second data rate;
based at least in part on the first communication metric data, updating, by the first node and for the communication link between the first node and the second node, at least one of:
the number of successful transmissions with the second node that is indicated in the second communication metric data; or
the number of unsuccessful transmissions with the second node that is indicated in the second communication metric data;
based at least in part on the second communication metric, selecting at least one of the first modulation scheme or the second modulation scheme; and
communicating, by the first node, with the second node according to the selected modulation scheme.

2. The method of claim 1, wherein the first data rate associated with the first modulation scheme is greater than the second data rate associated with the second modulation scheme; and
wherein the updating comprises updating the number of successful transmissions with the second node that is indicated in the second communication metric data.

3. The method of claim 2, wherein the updating comprises:
determining a difference between the number of successful transmissions with the second node for the first modulation scheme and the number of successful transmissions with the second node for the second modulation scheme;
determining that the difference is greater than a predetermined value;
updating a number of transmissions sent with the second node for the second modulation scheme to include the difference; and
updating the number of successful transmissions with the second node for the second modulation scheme to include the difference.

4. The method of claim 1, wherein the first data rate associated with the first modulation scheme is less than the second data rate associated with the second modulation scheme; and
wherein the updating comprises updating the number of unsuccessful transmissions with the second node that is indicated in the second communication metric data.

5. The method of claim 4, wherein the updating comprises:
determining a difference between the number of unsuccessful transmissions with the second node for the first modulation scheme and the number of unsuccessful transmissions with the second node for the second modulation scheme;
determining that the difference is greater than a predetermined value; and
updating a number of transmissions sent with the second node for the second modulation scheme to include the difference.

6. The method of claim 1, further comprising:
determining that a predetermined period of time has passed since a previous update to the second communication metric data;
wherein the determining the first communication metric data is based at least in part on determining that the predetermined period of time has passed.

7. The method of claim 1, further comprising:
determining that a predetermined number of transmission attempts have occurred with the second node for the first modulation scheme since a previous update to the second communication metric data;
wherein the determining the first communication metric data is based at least in part on determining that the predetermined number of transmission attempts have occurred with the second node for the first modulation scheme.

8. A network communication device comprising:
a radio configured to communicate with another network communication device according to a first modulation scheme, the first modulation scheme being associated with a first data rate;
one or more processors communicatively coupled to the radio; and
memory communicatively coupled to the one or more processors, the memory storing one or more instructions that, when executed by the one or more processors, cause the one or more processors to perform operations comprising:
determining communication metric data associated with the first modulation scheme, the communication metric data associated with the first modulation scheme indicating at least one of a number of successful transmissions with the other network communication device or a number of unsuccessful transmissions with the other network communication device;
based at least in part on the communication metric data associated with the first modulation scheme, updating at least one of a number of successful transmissions indicated by communication metric data associated with a second modulation scheme or a number of unsuccessful transmissions indicated by the communication metric data associated with the second modulation scheme, the second modulation scheme being associated with a second data rate;
based at least in part on the communication metric data associated with the second modulation scheme, selecting at least one of the first modulation scheme or the second modulation scheme; and
configuring the radio to operate according to the selected modulation scheme.

9. The network communication device of claim 8, wherein the first data rate associated with the first modulation scheme is greater than the second data rate associated with the second modulation scheme; and
wherein the updating comprises updating the number of successful transmissions indicated by the communication metric data associated with the second modulation scheme to account for at least one of the number of successful transmissions with the other network communication device for the first modulation scheme.

10. The network communication device of claim 9, wherein the operations further comprise:
updating communication metric data associated with a third modulation scheme to account for at least one of the number of successful transmissions with the other network communication device for the first modulation scheme, the second data rate associated with the second modulation scheme being greater than a third data rate associated with the third modulation scheme.

11. The network communication device of claim 8, wherein the first data rate associated with the first modulation scheme is less than the second data rate associated with the second modulation scheme; and wherein the updating comprises updating the number of unsuccessful transmissions indicated by the communication metric data associated with the second modulation scheme to account for at least one of the number of unsuccessful transmissions with the other network communication device for the first modulation scheme.

12. The network communication device of claim 11, wherein the operations further comprise:
updating communication metric data associated with a third modulation scheme to account for at least one of the number of unsuccessful transmissions with the other network communication device for the first modulation scheme, the second data rate associated with the second modulation scheme being greater than a third data rate associated with the third modulation scheme.

13. The network communication device of claim 8, wherein the network communication device comprises at least one of a utility meter, a relay, a repeater, a router, a transformer, a sensor, or a switch that is configured to communicate according to multiple modulation schemes that include the first modulation scheme and the second modulation scheme.

14. A system comprising:
one or more processors; and
memory communicatively coupled to the one or more processors, the memory storing one or more instructions that, when executed by the one or more processors, cause the one or more processors to perform operations comprising:
determining at least one of a number of successful transmissions between a first node and a second node with a first modulation scheme or a number of unsuccessful transmissions between the first node and the second node with the first modulation scheme, the first modulation scheme being associated with a first data rate;
based at least in part on the determining, attributing at least one of a successful transmission with the first modulation scheme or an unsuccessful transmission with the first modulation scheme to communication metric data associated with a second modulation scheme, the second modulation scheme being associated with a second data rate; and
based at least in part on the communication metric data associated with the second modulation scheme, causing a communication to be sent or received between the first node and the second node according to the first modulation scheme or the second modulation scheme.

15. The system of claim 14, wherein the first data rate associated with the first modulation scheme is greater than the second data rate associated with the second modulation scheme; and
wherein the attributing comprises:
updating a number of transmissions sent between the first node and the second node for the second modulation scheme based at least in part on the number of successful transmissions between the first node and the second node for the first modulation scheme; and
updating a number of successful transmissions between the first node and the second node for the second modulation scheme based at least in part on the number of successful transmissions between the first node and the second node for the first modulation scheme.

16. The system of claim 14, wherein the first data rate associated with the first modulation scheme is less than the second data rate associated with the second modulation scheme; and
wherein the attributing comprises:
updating a number of transmissions sent between the first node and the second node for the second modulation scheme based at least in part on of the number of unsuccessful transmissions between the first node and the second node for the first modulation scheme.

17. The system of claim 14, wherein the causing the communication to be sent or received between the first node and the second node comprises sending a communication to the first node instructing the first node to at least one of send or receive a communication with the second node according to the first modulation scheme or the second modulation scheme.

18. The system of claim 14, wherein the causing the communication to be sent or received between the first node and the second node comprises sending a communication according to the first modulation scheme or the second modulation scheme.

19. The system of claim 14, wherein the first data rate associated with the first modulation scheme is greater than the second data rate associated with the second modulation scheme.

20. The system of claim 14, wherein the first data rate associated with the first modulation scheme is less than the second data rate associated with the second modulation scheme.

* * * * *